United States Patent
Kang (10) Patent No.: US 12,080,079 B2
(45) Date of Patent: Sep. 3, 2024

(54) LANE RECOGNITION APPARATUS AND METHOD CONTROLLING SAME

(71) Applicant: HYUNDAI MOBIS CO., LTD., Seoul (KR)

(72) Inventor: Eun Seok Kang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 290 days.

(21) Appl. No.: 17/582,666

(22) Filed: Jan. 24, 2022

(65) Prior Publication Data

US 2022/0254168 A1   Aug. 11, 2022

(30) Foreign Application Priority Data

Feb. 9, 2021  (KR) .......................... 10-2021-0018118

(51) Int. Cl.
| | |
|---|---|
| *G06V 20/56* | (2022.01) |
| *B60W 30/095* | (2012.01) |
| *B60W 30/16* | (2020.01) |
| *B60W 30/18* | (2012.01) |
| *B60W 40/06* | (2012.01) |
| *B60W 50/14* | (2020.01) |

(52) U.S. Cl.
CPC ......... *G06V 20/588* (2022.01); *B60W 30/095* (2013.01); *B60W 30/0956* (2013.01); *B60W 30/18163* (2013.01); *B60W 50/14* (2013.01); *B60W 30/16* (2013.01); *B60W 40/06* (2013.01); *B60W 2050/146* (2013.01)

(58) Field of Classification Search
None
See application file for complete search history.

(56) References Cited

U.S. PATENT DOCUMENTS

| | | | | |
|---|---|---|---|---|
| 8,098,895 | B2 * | 1/2012 | Kageyama | G06V 20/588 |
| | | | | 382/104 |
| 9,460,624 | B2 * | 10/2016 | Pandita | G08G 1/167 |
| 10,074,281 | B2 * | 9/2018 | Pandita | G01C 21/28 |

(Continued)

FOREIGN PATENT DOCUMENTS

| | | | | |
|---|---|---|---|---|
| CN | 110103967 B | * | 10/2020 | ............ B60W 10/18 |
| CN | 110304063 B | * | 11/2020 | ...... B60W 30/18163 |

(Continued)

OTHER PUBLICATIONS

Extended European Search Report issued on Jul. 8, 2022, in counterpart European Patent Application No. 22155406.6 (8 Pages).

*Primary Examiner* — Kevin R Steckbauer
(74) *Attorney, Agent, or Firm* — NSIP Law (57) ABSTRACT

Provided are lane recognition apparatuses and methods including a sensor provided at a vehicle to detect a left line and a right line of a current lane, sense a left line distance and right line distance from a middle of the vehicle to the left line and right line, respectively, and a controller configured to set a sum of the left line distance and the right line distance as a lane width, when the sensor detects both the left line and the right line, correct the left line distance or the right line distance based on a previously set lane width, when the sensor detects one of the left line or the right line, and determine a moving state of the vehicle as any one of normal, left-biased, right-biased, or lane change driving state based on the left line and the right line of the current lane.

14 Claims, 9 Drawing Sheets

(56) References Cited

U.S. PATENT DOCUMENTS

| | | | | |
|---|---|---|---|---|
| 10,745,016 B2 * | 8/2020 | Bae | | B60W 40/04 |
| 10,984,551 B2 * | 4/2021 | Shikimachi | | G06T 7/74 |
| 11,643,092 B2 * | 5/2023 | Doemling | | B60W 60/0011 |
| | | | | 701/300 |
| 11,767,013 B2 * | 9/2023 | Chung | | B60W 30/08 |
| | | | | 701/25 |
| 2010/0138115 A1 * | 6/2010 | Kageyama | | B60R 21/0134 |
| | | | | 701/45 |
| 2010/0189306 A1 * | 7/2010 | Kageyama | | G06V 20/588 |
| | | | | 382/265 |
| 2015/0325127 A1 * | 11/2015 | Pandita | | G08G 1/167 |
| | | | | 701/523 |
| 2017/0004711 A1 * | 1/2017 | Pandita | | G08G 1/166 |
| 2017/0043772 A1 * | 2/2017 | Watanabe | | B60W 30/12 |
| 2019/0016340 A1 * | 1/2019 | Bae | | B60W 30/18109 |
| 2019/0035110 A1 * | 1/2019 | Shikimachi | | G01C 21/3626 |
| 2019/0251845 A1 * | 8/2019 | Kosaka | | G06V 20/588 |
| 2020/0255008 A1 * | 8/2020 | Kim | | B60W 30/12 |
| 2021/0061294 A1 * | 3/2021 | Doemling | | G06N 3/044 |
| 2022/0073065 A1 * | 3/2022 | Chung | | B60W 30/0956 |
| 2022/0080964 A1 * | 3/2022 | Fukushige | | B60W 40/04 |
| 2022/0178703 A1 * | 6/2022 | Hiroyuki | | G01C 21/32 |
| 2022/0254168 A1 * | 8/2022 | Kang | | B60W 30/18163 |
| 2023/0025414 A1 * | 1/2023 | Ma | | B60W 60/00188 |
| 2023/0227024 A1 * | 7/2023 | Munemura | | G06V 20/58 |
| | | | | 701/26 |
| 2023/0227025 A1 * | 7/2023 | Kuramochi | | B60W 50/0097 |
| | | | | 701/301 |
| 2023/0351887 A1 * | 11/2023 | Lengsfeld | | G06V 10/82 |

FOREIGN PATENT DOCUMENTS

| | | | | |
|---|---|---|---|---|
| CN | 112512890 A | * | 3/2021 | B60W 40/04 |
| CN | 113232658 A | * | 8/2021 | B60W 40/00 |
| CN | 112512890 B | * | 12/2021 | B60W 40/04 |
| CN | 110427850 B | * | 3/2022 | G06K 9/00228 |
| CN | 112477859 B | * | 3/2022 | B60W 30/12 |
| CN | 114212085 A | * | 3/2022 | |
| CN | 113232658 B | * | 6/2022 | B60W 40/00 |
| CN | 114655222 A | * | 6/2022 | |
| CN | 114750759 A | * | 7/2022 | B60W 30/165 |
| CN | 114940173 A | * | 8/2022 | B60W 30/095 |
| CN | 115203352 A | * | 10/2022 | |
| CN | 115203352 B | * | 11/2022 | |
| CN | 115610420 A | * | 1/2023 | B60W 30/18163 |
| CN | 116888035 A | * | 10/2023 | B60W 40/06 |
| DE | 102016113804 A1 | * | 2/2017 | B60W 30/12 |
| DE | 102019004833 A1 | * | 1/2020 | |
| DE | 102021109496 A1 | * | 10/2022 | |
| DE | 102022204089 A1 | * | 11/2023 | G06T 7/20 |
| EP | 3428027 A1 | * | 1/2019 | B60W 10/18 |
| EP | 4039555 A1 | * | 8/2022 | B60W 30/095 |
| EP | 4120215 A1 | * | 1/2023 | B60W 40/04 |
| JP | 2008257681 A | * | 10/2008 | B62D 15/025 |
| JP | 2009288867 A | * | 12/2009 | G06K 9/00798 |
| JP | 2016085567 A | * | 5/2016 | B60R 21/00 |
| JP | 6336888 B2 | * | 6/2018 | B60R 21/00 |
| JP | 6342104 B1 | * | 6/2018 | G01C 21/26 |
| JP | 2022039311 A | * | 3/2022 | B60W 10/20 |
| JP | 2022060934 A | * | 4/2022 | B60W 30/12 |
| KR | 10-2007304 B1 | | 8/2019 | |
| KR | 2061140 B1 | * | 2/2020 | B60K 35/00 |
| WO | WO-2016063687 A1 | * | 4/2016 | B60R 21/00 |
| WO | WO-2018074288 A1 | * | 4/2018 | B60R 21/00 |
| WO | WO-2020152490 A1 | * | 7/2020 | B60R 21/00 |
| WO | WO-2021196041 A1 | * | 10/2021 | B60W 30/16 |
| WO | WO-2021196144 A1 | * | 10/2021 | B60W 40/04 |
| WO | WO-2023273780 A1 | * | 1/2023 | B60W 40/00 |
| WO | WO-2023037893 A1 | * | 3/2023 | |
| WO | WO-2023201964 A1 | * | 10/2023 | B60W 30/165 |

\* cited by examiner

Lane change state

Warning area

LANE RECOGNITION APPARATUS AND METHOD CONTROLLING SAME

CROSS REFERENCE TO RELATED APPLICATION

The application claims the benefit under 35 USC § 119(a) of Korean Patent Application No. 10-2021-0018118, filed on Feb. 9, 2021, in the Korean Intellectual Property Office, the entire disclosure of which is incorporated herein by reference for all purposes.

BACKGROUND OF THE INVENTION

1. Field

The following description is related to recognizing lanes by using a sensor provided at a vehicle, and using the recognized lanes for a warning system when the vehicle makes a lane change, to prevent false warnings from BSD and LCA systems.

2. Description of Related Art

With the introduction of an Advanced Driver Assistance System (ADAS) technology for a driver's convenience, it is very important to accurately recognize information on a lane in which a vehicle travels.

According to conventional blind spot detection (BSD) and line change assistance (LCA) systems, while a subject vehicle in the middle of driving changes lanes, when a following vehicle is in a blind spot and is thus not viewed in a side-view mirror of the subject vehicle, a flashing warning light at the side-view mirror warns the driver of the subject vehicle.

These systems assist in changing lanes safely, but sometimes cause drivers to feel fatigue as the systems run even when no warning is needed.

The foregoing is intended merely to aid in the understanding of the background of the present invention, and is not intended to mean that the present invention falls within the purview of the related art that is already known to those skilled in the art.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a lane recognition apparatus, including a sensor provided at a subject vehicle, and being configured to detect a left line and a right line of a current lane, sense a first left line distance from a middle of the subject vehicle to the left line and a first right line distance from the middle of the subject vehicle to the right line, and to transmit a result of sensing to a controller, a radar provided at the subject vehicle, and being configured to collect following-vehicle location information of a following vehicle and to transmit the following-vehicle location information to the controller, and the controller being configured to set a sum of the first left line distance and the first right line distance as a lane width, in response to the sensor detecting both the left line and the right line, correct the first left line distance or the first right line distance based on a previously set lane width, in response to the sensor detecting one of the left line or the right line, determine a second left line distance that is a distance between the middle of the subject vehicle and a left line of a left lane of the current lane based the corrected first left line distance or the first left line distance, determine a second right line distance that is a distance between the middle of the subject vehicle and a right line of a right lane of the current lane based on the corrected first right line distance or the first right line distance, and determine a moving state of the subject vehicle as any one of a normal driving state, a left-biased driving state, a right-biased driving state, or a lane change state based on information on the left line of the current lane and the right line of the current lane.

The controller may be configured to correct the first left line distance with a difference between the previously set lane width and the first right line distance, in response to the left line of the current lane not being detected, or correct the first right line distance with a difference between the previously set lane width and the first left line distance, in response to the right line of the current lane not being detected.

The controller may be configured to determine that the moving state of the subject vehicle is the normal driving state, in response to both the left and the right line of the current lane being detected, determine that the moving state of the subject vehicle is the left-biased driving state, in response to the first left line distance being less than a first threshold value and the first right line distance being greater than a second threshold value, determine that the moving state of the subject vehicle is the right-biased driving state, in response to the first right line distance being less than the first threshold value and the first left line distance being greater than the second threshold value, or determine that the moving state of the subject vehicle is the lane change state, in response to a time period during which the left and the right line of the current lane are not recognized being greater than a third threshold value.

The controller may be configured to set a following-vehicle warning area based on the first left line distance and the first right line distance, determine that a warning condition is satisfied, in response to the following vehicle being located in the following-vehicle warning area, and provide a warning to the following vehicle, in response to the warning condition being satisfied, prepare for a collision with the following vehicle, in response to the subject vehicle being in the lane change state.

The controller may be configured to not provide the warning to the following vehicle, in response to the subject vehicle being in the normal driving state, the left-biased driving state, or the right-biased driving state and the following vehicle being located within the first left line distance or the first right line distance and traveling in the current lane.

The controller may be configured to not provide the warning to the following vehicle, in response to the subject vehicle being in the normal driving state, the left-biased driving state, or the right-biased driving state and the following being located beyond the second left line distance or the second right line distance.

The controller may be configured to not provide the warning to the following vehicle, in response to recognizing that the subject vehicle is in the lane change state and moving away from the following vehicle.

In another general aspect, there is provided method of lane recognition, the method comprising detecting, by a sensor, a left line and a right line of a current lane, sensing a first left line distance from a middle of a subject vehicle to the left line of the current lane and a first right line distance from the middle of the subject vehicle to the right line of the current lane, and transmitting the result of sensing to a controller, collecting, by a radar, following-vehicle location information of a following vehicle, and transmitting the following-vehicle location information to the controller, setting, at the controller, a sum of the first left line distance and the first right line distance as the lane width, in response to the sensor detecting both the left line and the right line of the current lane, correcting the first left line distance or the first right line distance based on a previously set lane width, in response to the sensor detecting one of the left line or the right line of the current lane, determining a second left line distance that is the distance between the middle of the subject vehicle and the left line of the left lane of the current lane based the corrected first left line distance or the first left line distance, determining a second right line distance that is the distance between the middle of the subject vehicle and the right line of the right lane of the current lane, and determining a moving state of the subject vehicle as any one of a normal driving state, a left-biased driving state, a right-biased driving state, or a lane change state based on information on the left line of the current lane and the right line of the current lane.

The correcting of the first left line distance or the first right line distance may include correcting the first left line distance with a difference between the previously set lane width and the first right line distance, in response to the left line of the current lane not being detected, or correcting the first right line distance with a difference between the previously set lane width and the first left line distance, in response to the right line of the current lane not being detected.

The determining of the moving state of the subject vehicle may include determining that the moving state of the subject vehicle is the normal driving state, in response to both the left and the right line of the current lane being detected, determining that the moving state of the subject vehicle is the left-biased driving state, in response to the first left line distance being less than a first threshold value and the first right line distance is greater than a second threshold value, determining that the moving state of the subject vehicle is the right-biased driving state, in response to the first right line distance being less than the first threshold value and the first left line distance is greater than the second threshold value, or determining that the moving state of the subject vehicle is the lane change state, in response to a time period during which the left and the right line of the current lane are not recognized being greater than a third threshold value.

The method may include setting, by the controller, a following-vehicle warning area based on the first left line distance and the first right line distance, determining that a warning condition is satisfied, in response to the following vehicle being located in the following-vehicle warning area, and providing a warning of the following vehicle, in response to the warning condition being satisfied, and preparing for a collision with the following vehicle, in response to the subject vehicle being in the lane change state.

The method may include not providing the warning to the following vehicle, in response to the subject vehicle being in the normal driving state, the left-biased driving state, or the right-biased driving state and the following vehicle being located within the first left line distance or the first right line distance and traveling in the current lane.

The method may include not providing the warning to the following vehicle, in response the subject vehicle being in the normal driving state, the left-biased driving state, or the right-biased driving state and the following vehicle being located beyond the second left line distance or the second right line distance.

The method may include not providing the warning to the following vehicle, in response to recognizing that the subject vehicle is in the lane change state and moving away from the following vehicle.

Other features and aspects will be apparent from the following detailed description, the drawings, and the claims.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION OF THE INVENTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

In this description, to give a warning of a following vehicle means to warn a driver of a subject vehicle and a driver of the following vehicle, and not to give a warning means not to warn the driver of the subject vehicle and the driver of the following vehicle.

Figure 1:
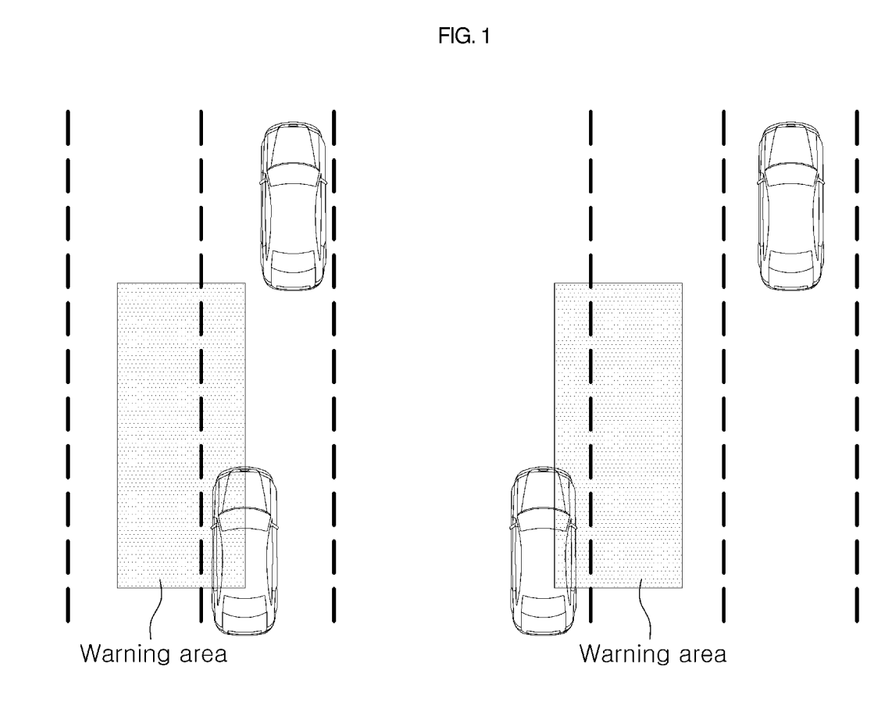
FIGS. 1 and 2 are diagrams illustrating problems in the related art.

Referring to FIG. 1, when lanes are wide, conventional BSD and LCA systems recognize the following vehicle traveling in the same lane as a risk factor and give a false warning to the driver of the subject vehicle. When lanes are narrow, the conventional systems recognize the following vehicle traveling in the lane next to the next lane of the current lane as a risk factor and give a false warning to the driver of the subject vehicle, which causes the driver to feel fatigue.

To prevent this, it is necessary to prevent the BSD and LCA systems from warning the driver when a following vehicle is not recognized as a risk factor. For this, a system capable of recognizing a lane accurately is required to be supported.

Figure 2:
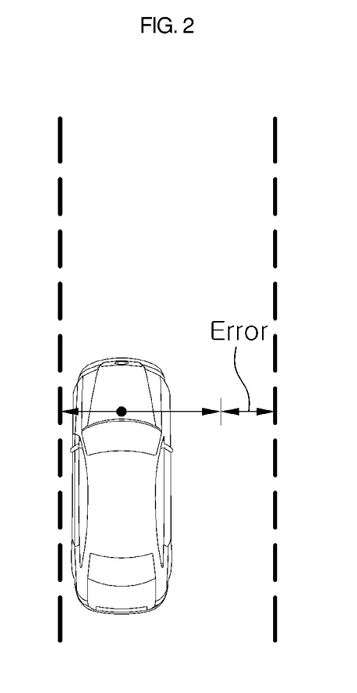

Referring to FIG. 2, a conventional lane recognition system has a limit in a lane recognition range, so when a vehicle travels close one line of a lane, the other line of the lane may not be recognized. That is, as shown in FIG. 2, when the vehicle travels close to the left side, a sensor of the vehicle is unable to recognize the right line of the lane and determines that the right line is at a distance longer than the maximum distance. Accordingly, lane recognition is not performed accurately, and an error occurs.

Therefore, a lane recognition system capable of recognizing a lane accurately needs to be developed first. The present invention will be described with reference to FIG. 3.

Figure 3:
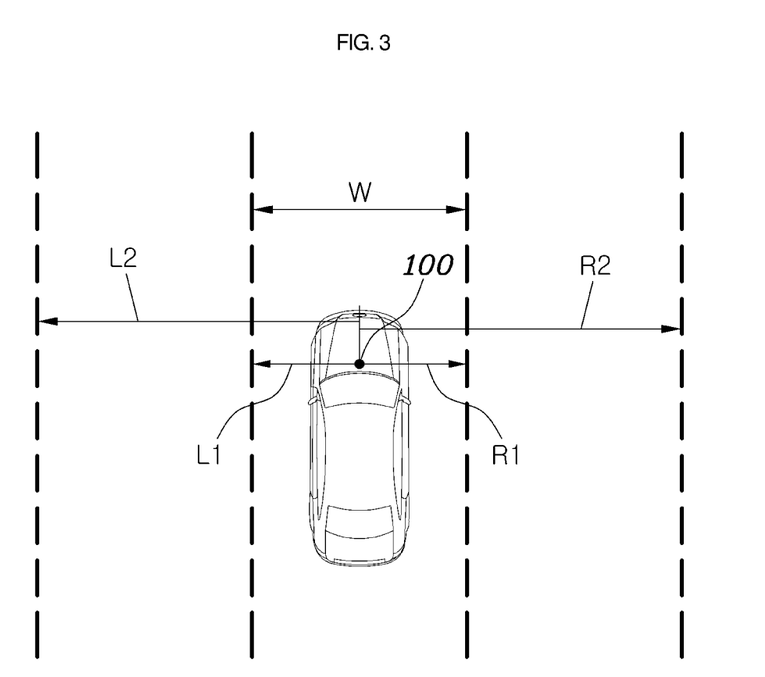
FIGS. 3 and 4 are diagrams illustrating a lane recognition system according to the present invention.

According to the present invention, there is provided a lane recognition system including: a sensor 100 provided at a subject vehicle, and configured to detect a left line and a right line of a current lane, sense a first left line distance L1 from a middle of the subject vehicle to the left line and a first right line distance R1 from the middle of the subject vehicle to the right line, and transmit a result of sensing to a controller; a radar (not shown) provided at the subject vehicle, and configured to collect following-vehicle location information of a following vehicle and transmit the following-vehicle location information to the controller; and the controller (not shown) configured to set a sum of the first left line distance L1 and the first right line distance R1 as a lane width W when the sensor detects both the left line and the right line, use the previously set lane width W to correct the first left line distance L1 or the first right line distance R1 when the sensor detects either the left line or the right line, use the corrected or uncorrected first left line distance to set a second left line distance L2 that is a distance between the subject vehicle and a left line of a left lane of the current lane, use the corrected or uncorrected first right line distance to set a second right line distance R2 that is a distance between the subject vehicle and a right line of a right lane of the current lane, and recognize that a moving state of the subject vehicle is a normal driving state, a left-biased driving state, a right-biased driving state, or a lane change state, from information on the left line of the current lane and the right line of the current lane.

Specifically, the sensor 100 senses the distance from the subject vehicle to the left line as the first left line distance L1, and senses the distance from the subject vehicle to the right line as the first right line distance R1. When the sensor senses both the left line and the right line, the sum of the first left line distance L1 and the first right line distance R1 is set as the lane width.

When the sensor sets the lane width, the controller sets the sum of the lane width and the first left line distance L1 as the second left line distance L2 and sets the sum of the lane width and the first right line distance R1 as the second right line distance R2.

When the sensor 100 recognizes either the left line or the right line because of the biased driving of the subject vehicle, the controller corrects and calculates the first left line distance or the first right line distance by using the previously used lane width W and the first right line distance R1 or the first left line distance L1. That is, referring to FIG. 4, when only the right line is detected and the left line is not detected, the controller corrects the first left line distance with the difference between the previously set lane width and the first right line distance. When only the left line is detected and the right line is not detected, the controller corrects the first right line distance with the difference between the previously set lane width and the first left line distance.

Figure 4:
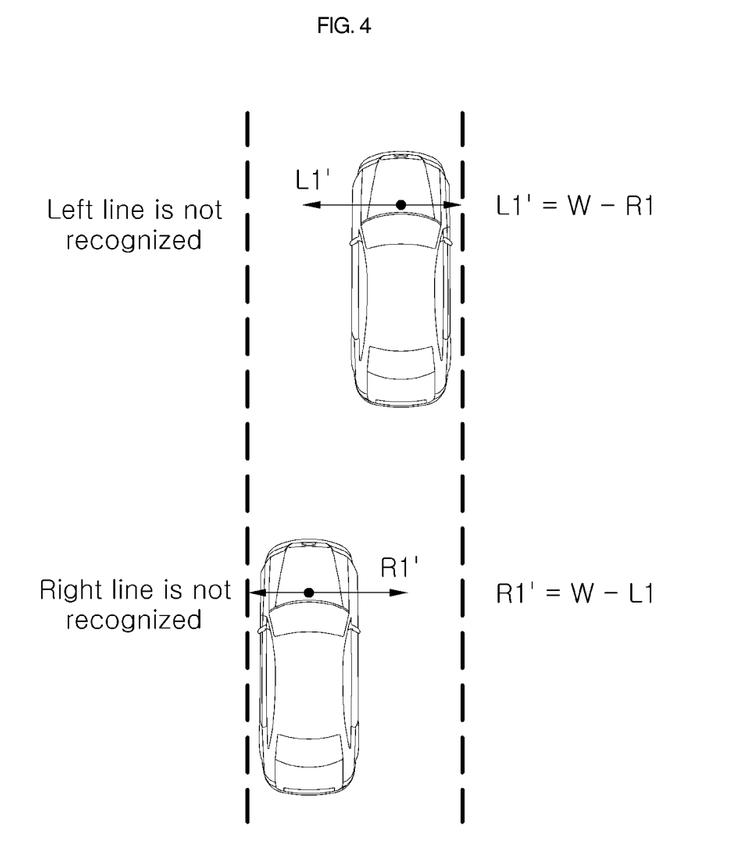

In addition, when the left line is not recognized, the second left line distance is set by adding the corrected first left line distance L1' and the previously set lane width and the second right line distance is set by adding the first right line distance and the previously set lane width. When the right line is not recognized, the second left line distance is set by adding the first left line distance and the previously set lane width and the second right line distance is set by adding the corrected first right line distance R1' and the previously set lane width.

In the meantime, the controller may recognize the moving state of the subject vehicle at a normal driving state, a left-biased driving state, a right-biased driving state, or a lane change state. Specifically, when both left and right lines are detected, the moving state of the subject vehicle is recognized as the normal driving state. The normal driving state is a state in which both left and right lines are detected and a lane change is not performed. When the first left line distance is less than a first threshold value and the first right line distance is greater than a second threshold value, the moving state of the subject vehicle is recognized as the left-biased driving state. When the first right line distance is less than the first threshold value and the first left line distance is greater than the second threshold value, the moving state of the subject vehicle is recognized as the right-biased driving state. In addition, when the time period during which the left and right lines are not recognized is greater than a third threshold value, the moving state of the subject vehicle is recognized as the lane change state.

Different first threshold values, second threshold values, and third threshold values may be set according to a situation. Specifically, the first threshold value, the second threshold value, and the third threshold value are variable values that may vary according to road conditions, such as rainfall, snowfall, fog, and lane conditions.

In the meantime, the controller sets a following-vehicle warning area on the basis of the first left line distance and the first right line distance. When a following vehicle is located in the following-vehicle warning area, it is considered that a warning condition is satisfied. When the subject vehicle is in the lane change state, a warning of the following vehicle is given and preparation for a collision with the following vehicle is performed.

Figure 5:
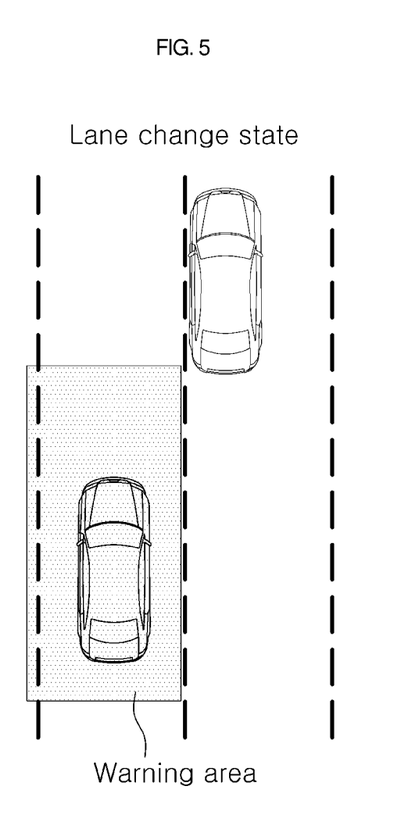
FIG. 5 is a diagram illustrating a case in which warning of a following vehicle is required.

Specifically, referring to FIG. 5, the following-vehicle warning area is set on the basis of the first left line distance and the first right line distance, and may be variously set according to road conditions, such as rainfall, snowfall, fog, and lane conditions. When a vehicle is in the following-vehicle warning area, the controller considers that the warning condition is basically satisfied, and controls the subject vehicle to transmit a warning signal to the following vehicle to urge caution. The warning signal may take a method of switching the tail lights on and off rapidly. In addition, the subject vehicle is in the lane change state and a collision with the following vehicle is sufficiently expected. Therefore, the subject vehicle may be controlled to perform preparation for the collision, for example, preparing to tighten the seat belts of all the seats of the subject vehicle including the driver's seat.

Further, when the controller recognizes that the subject vehicle is in the normal driving state, the left-biased driving state, or the right-biased driving state and the following vehicle is located within the first left line distance or the first right line distance and is traveling in the same lane as the subject vehicle, a warning of the following vehicle is not given.

Figure 6:
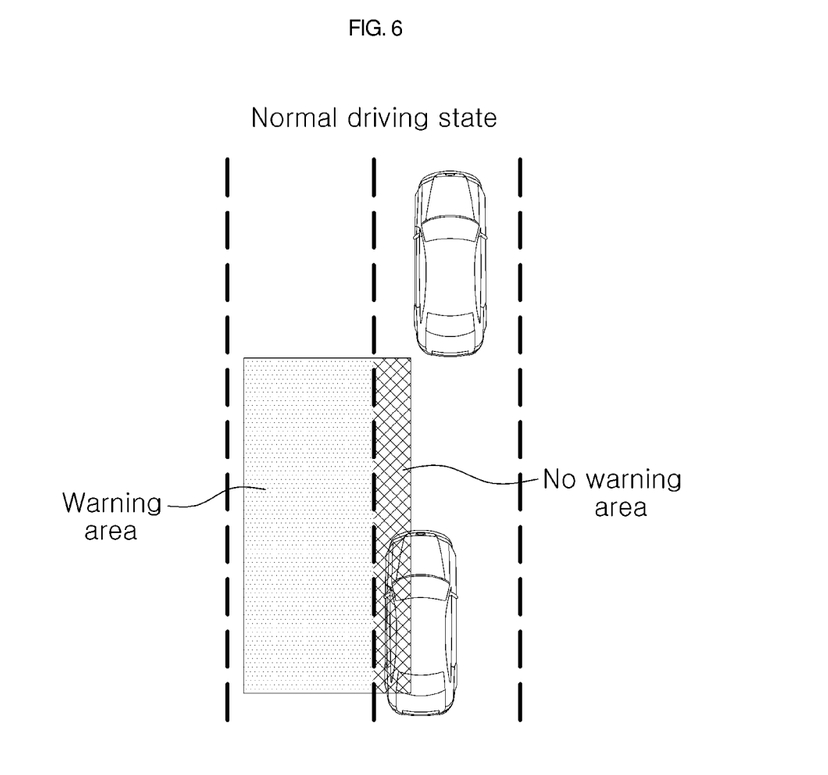
FIGS. 6 to 8 are diagrams illustrating cases in which warning of a following vehicle is not required.

Specifically, referring to FIG. 6, the subject vehicle is in the normal driving state and the following vehicle is located in the following-vehicle warning area, but it is recognized that the following vehicle is located within the first left line distance and is traveling in the same lane as the subject vehicle. Therefore, a warning signal is not transmitted for the following vehicle. In the related art, when lanes are wide and a following vehicle travels close to a side, the following vehicle is located in the following-vehicle warning area and a warning is thus given to the driver of the subject vehicle. However, in the case of using the system according to the present invention, it is recognized that the following vehicle is at the first left line distance and is traveling in the same lane as the subject vehicle, and the subject vehicle is in the normal driving state, so a warning is not given to the driver of the following vehicle as well as the driver of the subject vehicle.

In addition, when the controller recognizes that the subject vehicle is in the normal driving state, the left-biased driving state, or the right-biased driving state and that the following vehicle is located beyond the second left line distance or the second right line distance although the following vehicle satisfies the warning condition, a warning of the following vehicle is not given.

Figure 7:
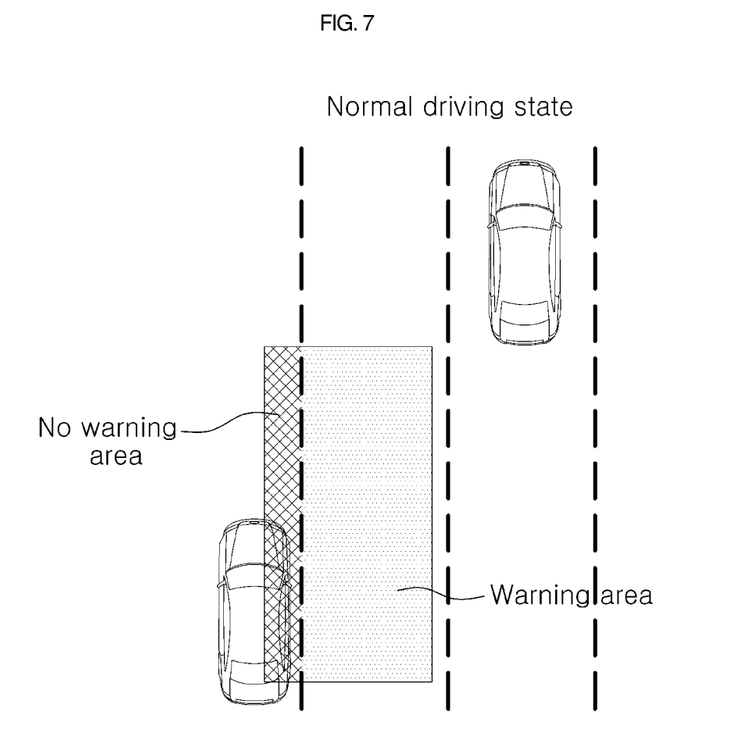

Specifically, referring to FIG. 7, the subject vehicle is in the normal driving state and the following vehicle is located in the following-vehicle warning area, but it is recognized that the following vehicle is located beyond the second left line distance. Therefore, a warning of the following vehicle is not given. That is, when a subject vehicle travels on a road with narrow lanes, the following vehicle in the lane next to the next lane of the current lane is erroneously recognized and a warning signal is transmitted to the driver of the subject vehicle driver in the related art. However, in the case of using the system according to the present invention, it is possible to recognize the vehicle in the lane next to the next lane of the current lane. In this case, a warning is not given to the driver of the following vehicle as well as the driver of the subject vehicle.

In the meantime, although the following vehicle satisfies the warning condition and the subject vehicle is in the lane change state, when the controller recognizes that the subject vehicle makes a lane change to move away from the following vehicle, a warning of the following vehicle is not given.

Figure 8:
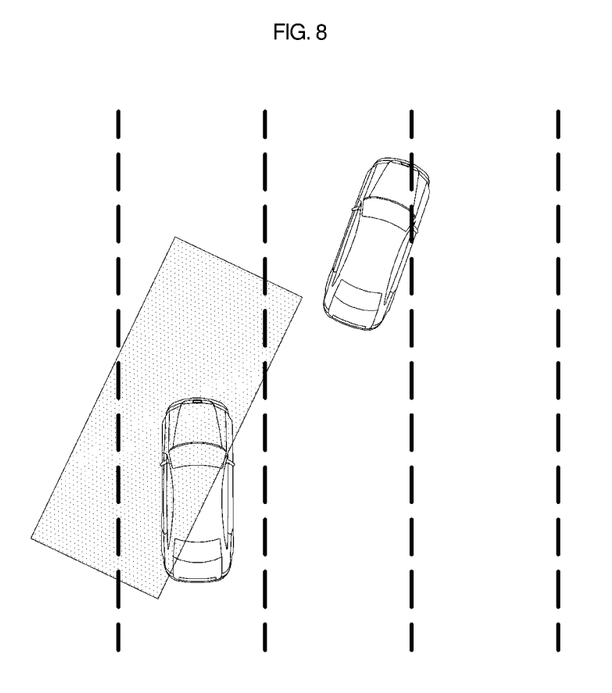

Specifically, referring to FIG. 8, the subject vehicle is in the lane change state and the following vehicle is located in the following-vehicle warning area, but the subject vehicle moves away from the following vehicle when changing the lane. In this case, a warning of the following vehicle is not given.

More specifically, when the subject vehicle changes the lane to the right lane, the right-biased driving state is entered and then the lane change state is entered. Therefore, when the moving state is changed from the right-biased driving state to the lane change state, the controller recognizes that the subject vehicle changes the lane to the right lane. The controller may not give a warning of the left following vehicle even through the following vehicle on the left side is in the following-vehicle warning area. This may also be applied to the case in which the subject vehicle changes the lane to the left lane and there is a following vehicle on the right side.

Figure 9:
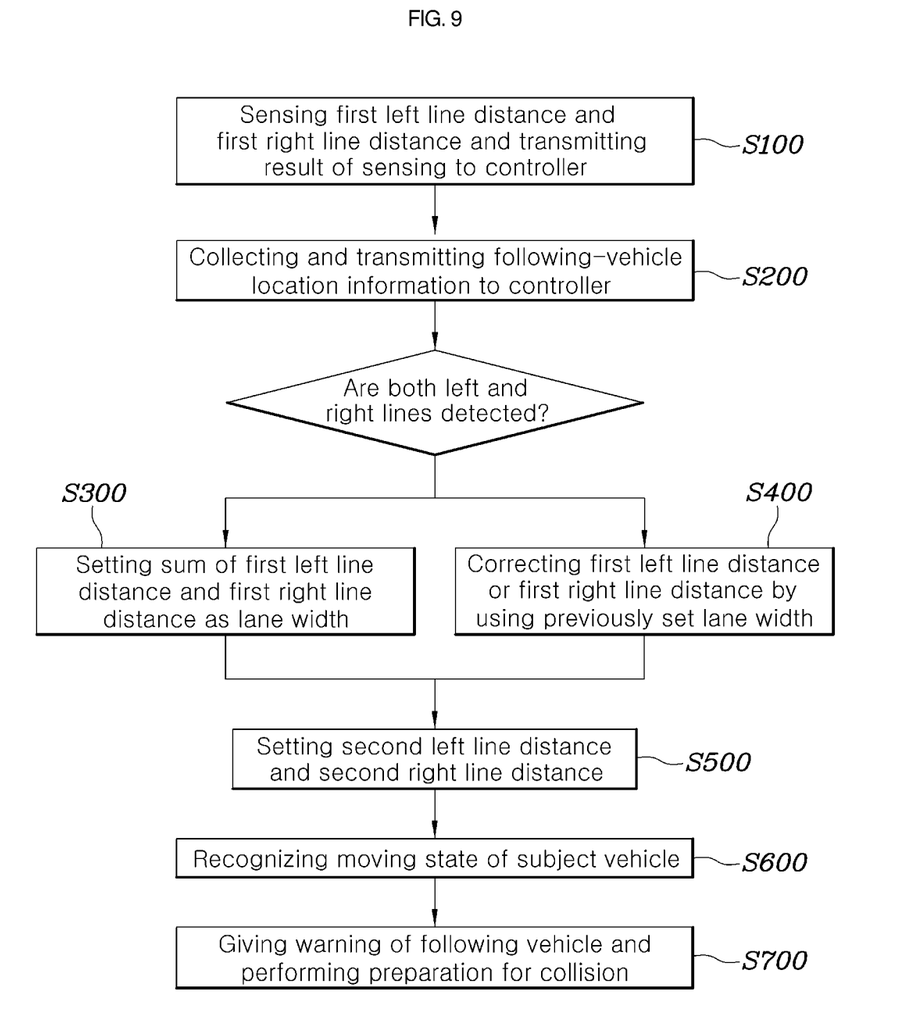
FIG. 9 is a flowchart illustrating a method of controlling the lane recognition system.

Referring to FIG. 9, there is provided a method of controlling the lane recognition system of claim 1, the method including: detecting, by the sensor, the left line and the right line of the current lane, sensing the first left line distance from the middle of the subject vehicle to the left line and the first right line distance from the middle of the subject vehicle to the right line, and transmitting the result of sensing to the controller at step S100; collecting, by the radar, the following-vehicle location information of the following vehicle, and transmitting the following-vehicle location information to the controller at step S200; setting the sum of the first left line distance and the first right line distance as the lane width when the sensor detects both the left line and the right line, at step S300; correcting the first left line distance or the first right line distance by using the previously set lane width when the sensor detects either the left line or the right line, at step S400; using the corrected or uncorrected first left line distance to set the second left line distance that is the distance between the subject vehicle and the left line of the left lane of the current lane, and using the corrected or uncorrected first right line distance to set the second right line distance that is the distance between the subject vehicle and the right line of the right lane of the current lane, at step S500; and recognizing that the moving state of the subject vehicle is the normal driving state, the left-biased driving state, the right-biased driving state, or the lane change state, from information on the left line of the current lane and the right line of the current lane at step S600.

The method may further include setting, by the controller, the following-vehicle warning area on the basis of the first left line distance and the first right line distance, considering that the warning condition is satisfied when the following vehicle is located in the following-vehicle warning area, and giving a warning of the following vehicle and performing preparation for a collision with the following vehicle when the subject vehicle is in the lane change state, at step S700.

According to the lane recognition system and the method of controlling the same, malfunctions of BSD and LCA systems and false warnings therefrom can be prevented, so that the driver is assisted not to feel fatigue. In addition, when the subject vehicle makes a lane change, a warning signal is transmitted to the following vehicle to urge caution, thereby reducing accidents that may occur when the lane change is made.

As described above, the lane recognition system may prevent malfunction of BSD and LCA systems and false warnings, so that the driver is assisted not to feel fatigue driver. In addition, when the subject vehicle makes a lane change, a warning signal is transmitted to the following vehicle to urge caution, thereby reducing accidents that may occur when the lane change is made.

As described above, the lane recognition system that is capable of reducing false warnings from BSD and LCA systems, and of transmitting a warning signal to a following vehicle when it is detected that collision with the following vehicle may occur if a lane change is performed.

The apparatuses, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The software may include a computer program, a piece of code, an instruction, or some combination thereof, to independently or uniformly instruct or configure the processing device to operate as desired. Software and data may be embodied permanently or temporarily in any type of machine, component, physical or pseudo equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the lane recognition method. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A lane recognition apparatus, comprising:
   a sensor provided at a subject vehicle, and being configured to detect a left line and a right line of a current lane, sense a first left line distance from a middle of the subject vehicle to the left line and a first right line distance from the middle of the subject vehicle to the right line, and to transmit a result of sensing to a controller;
   a radar provided at the subject vehicle, and being configured to collect following-vehicle location information of a following vehicle and to transmit the following-vehicle location information to the controller; and
   the controller being configured to:
      set a sum of the first left line distance and the first right line distance as a lane width, in response to the sensor detecting both the left line and the right line,
      correct the first left line distance or the first right line distance based on a previously set lane width, in response to the sensor detecting only one of the left line or the right line,
      determine a second left line distance that is a distance between the middle of the subject vehicle and a left line of a left lane of the current lane based on the corrected first left line distance,
      determine a second right line distance that is a distance between the middle of the subject vehicle and a right line of a right lane of the current lane based on the corrected first right line distance, and
      determine a moving state of the subject vehicle as any one of a normal driving state, a left-biased driving state, a right-biased driving state, or a lane change state based on information on the left line of the current lane and the right line of the current lane.

2. The system of claim 1, wherein the controller is further configured to:
   correct the first left line distance with a difference between the previously set lane width and the first right line distance, in response to the left line of the current lane not being detected, or
   correct the first right line distance with a difference between the previously set lane width and the first left line distance, in response to the right line of the current lane not being detected.

3. The apparatus of claim 1, wherein the controller is further configured to:
   determine that the moving state of the subject vehicle is the normal driving state, in response to both the left and the right line of the current lane being detected,
   determine that the moving state of the subject vehicle is the left-biased driving state, in response to the first left line distance being less than a first threshold value and the first right line distance being greater than a second threshold value,
   determine that the moving state of the subject vehicle is the right-biased driving state, in response to the first right line distance being less than the first threshold value and the first left line distance being greater than the second threshold value, or
   determine that the moving state of the subject vehicle is the lane change state, in response to a time period during which the left and the right line of the current lane are not recognized being greater than a third threshold value.

4. The apparatus of claim 1, wherein the controller is further configured to:
   set a following-vehicle warning area based on the first left line distance and the first right line distance,
   determine that a warning condition is satisfied, in response to the following vehicle being located in the following-vehicle warning area,
   provide a warning to the following vehicle, in response to the warning condition being satisfied, and prepare for a collision with the following vehicle, in response to the subject vehicle being in the lane change state.

5. The apparatus of claim 4, wherein the controller is further configured to:
not provide the warning to the following vehicle, in response to the subject vehicle being in the normal driving state, the left-biased driving state, or the right-biased driving state and the following vehicle being located within the first left line distance or the first right line distance and traveling in the current lane.

6. The apparatus of claim 4, wherein the controller is further configured to:
not provide the warning to the following vehicle, in response to the subject vehicle being in the normal driving state, the left-biased driving state, or the right-biased driving state and the following being located beyond the second left line distance or the second right line distance.

7. The apparatus of claim 4, wherein the controller is configured to:
not provide the warning to the following vehicle, in response to recognizing that the subject vehicle is in the lane change state and moving away from the following vehicle.

8. A method of lane recognition, the method comprising:
detecting, by a sensor, a left line and a right line of a current lane, sensing a first left line distance from a middle of a subject vehicle to the left line of the current lane and a first right line distance from the middle of the subject vehicle to the right line of the current lane, and transmitting the result of sensing to a controller;
collecting, by a radar, following-vehicle location information of a following vehicle, and transmitting the following-vehicle location information to the controller;
setting, at the controller, a sum of the first left line distance and the first right line distance as the lane width, in response to the sensor detecting both the left line and the right line of the current lane;
correcting the first left line distance or the first right line distance based on a previously set lane width, in response to the sensor detecting only one of the left line or the right line of the current lane;
determining a second left line distance that is the distance between the middle of the subject vehicle and the left line of the left lane of the current lane based on the corrected first left line distance;
determining a second right line distance that is the distance between the middle of the subject vehicle and the right line of the right lane of the current lane; and
determining a moving state of the subject vehicle as any one of a normal driving state, a left-biased driving state, a right-biased driving state, or a lane change state based on information on the left line of the current lane and the right line of the current lane.

9. The method of claim 8, wherein the correcting of the first left line distance or the first right line distance comprises:
correcting the first left line distance with a difference between the previously set lane width and the first right line distance, in response to the left line of the current lane not being detected, or
correcting the first right line distance with a difference between the previously set lane width and the first left line distance, in response to the right line of the current lane not being detected.

10. The method of claim 8, wherein the determining of the moving state of the subject vehicle comprises:
determining that the moving state of the subject vehicle is the normal driving state, in response to both the left and the right line of the current lane being detected,
determining that the moving state of the subject vehicle is the left-biased driving state, in response to the first left line distance being less than a first threshold value and the first right line distance is greater than a second threshold value,
determining that the moving state of the subject vehicle is the right-biased driving state, in response to the first right line distance being less than the first threshold value and the first left line distance is greater than the second threshold value, or
determining that the moving state of the subject vehicle is the lane change state, in response to a time period during which the left and the right line of the current lane are not recognized being greater than a third threshold value.

11. The method of claim 8, further comprising:
setting, by the controller, a following-vehicle warning area based on the first left line distance and the first right line distance,
determining that a warning condition is satisfied, in response to the following vehicle being located in the following-vehicle warning area,
providing a warning of the following vehicle, in response to the warning condition being satisfied, and
preparing for a collision with the following vehicle, in response to the subject vehicle being in the lane change state.

12. The method of claim 11, further comprising:
not providing the warning of the following vehicle, in response to the subject vehicle being in the normal driving state, the left-biased driving state, or the right-biased driving state and the following vehicle being located within the first left line distance or the first right line distance and traveling in the current lane.

13. The method of claim 11, further comprising:
not providing the warning of the following vehicle, in response the subject vehicle being in the normal driving state, the left-biased driving state, or the right-biased driving state and the following vehicle being located beyond the second left line distance or the second right line distance.

14. The method of claim 11, further comprising:
not providing the warning of the following vehicle, in response to recognizing that the subject vehicle is in the lane change state and move away from the following vehicle.

* * * * *